United States Patent

[11] 3,619,643

[72] Inventor William Folsom Davis
Tempe, Ariz.
[21] Appl. No. 45,433
[22] Filed June 11, 1970
[45] Patented Nov. 9, 1971
[73] Assignee Motorola, Inc.
Franklin Park, Ill.

[54] LOW-POWER HIGH-FREQUENCY DIVIDER
6 Claims, 3 Drawing Figs.

[52] U.S. Cl. .......... 307/225, 307/223
[51] Int. Cl. .......... H03k 23/08
[50] Field of Search .......... 307/225, 226, 224, 223

[56] References Cited

UNITED STATES PATENTS

| | | | |
|---|---|---|---|
| 2,843,320 | 7/1958 | Chisholm | 307/226 |
| 2,882,404 | 4/1959 | Denton | 307/225 |
| 3,035,185 | 5/1962 | Schwenker | 307/223 |
| 3,069,557 | 12/1962 | Skelton | 307/223 |

*Primary Examiner*—John S. Heyman
*Attorney*—Mueller & Aichele

ABSTRACT: A frequency divider is disclosed in which six transistors are connected in three pairs, the collector of the second one of each pair of transistors is connected to the collector of the first transistor of another pair of transistors providing a ringlike configuration, while the collector of the first one of each pair is coupled via a capacitor to the base of the other one of that pair of transistors and the current through the emitters of each of the pairs is supplied from a constant current source. The resultant frequency divider when using good high-frequency low-current transistors requires power in the order of one-seventieth of the power required by known similar frequency dividers.

INVENTOR
WILLIAM FOLSOM DAVIS
BY
Mueller & Aichele
ATTY'S

INVENTOR.
WILLIAM FOLSOM DAVIS
BY
Mueller & Aichele
ATTY'S

| TRANSISTOR | TIME INTERVALS → A | B | C | D | E | F | G | H |
|---|---|---|---|---|---|---|---|---|
| 18 | OFF | ON | ON | ON | OFF | OFF | OFF | ON |
| 28 | ON | OFF | OFF | OFF | ON | ON | ON | OFF |
| 20 | ON | ON | OFF | OFF | OFF | ON | ON | ON |
| 56 | OFF | OFF | ON | ON | ON | OFF | OFF | OFF |
| 22 | OFF | OFF | OFF | ON | ON | ON | OFF | OFF |
| 32 | ON | ON | ON | OFF | OFF | OFF | ON | ON |

INVENTOR.
WILLIAM FOLSOM DAVIS
BY Mueller & Aichele
ATTY'S

LOW-POWER HIGH-FREQUENCY DIVIDER

BACKGROUND

This invention relates to frequency dividers. A frequency divider which will divide by three and which comprises six transistors connected in a ringlike configuration is known. However, this known frequency divider requires substantial power in the order of 2 watts per stage and two relatively high-voltage supplies at about 20 volts positive and at about 20 volts negative with respect to ground. This wattage dissipation and voltage requirement is too high for many purposes, especially for man carried military equipment. Furthermore, a low-power dissipation device requiring low voltages to ground makes for economy of operation.

It is an object of this invention to provide an improved frequency divider which will operate at a substantially lower voltage and which will dissipate substantially less power than known similar frequency dividers.

SUMMARY

In accordance with the invention, a plurality of transistors are arranged in pairs with the collector of a second transistor of one pair directly connected to the collector of a first transistor of another pair whereby a ringlike configuration is provided. Furthermore, the collector of each transistor of each pair is coupled to the base of the second transistor of the same pair by way of a capacitor and constant current is taken from the joined emitters of each pair. In such a frequency divider, the energy dissipated in the divider may be reduced by a factor of about 70 and the voltage requirement to operate the improved frequency divider may be reduced by a factor of about 10 over known similar frequency dividers for dividing a given frequency.

DESCRIPTION

Figure 1:
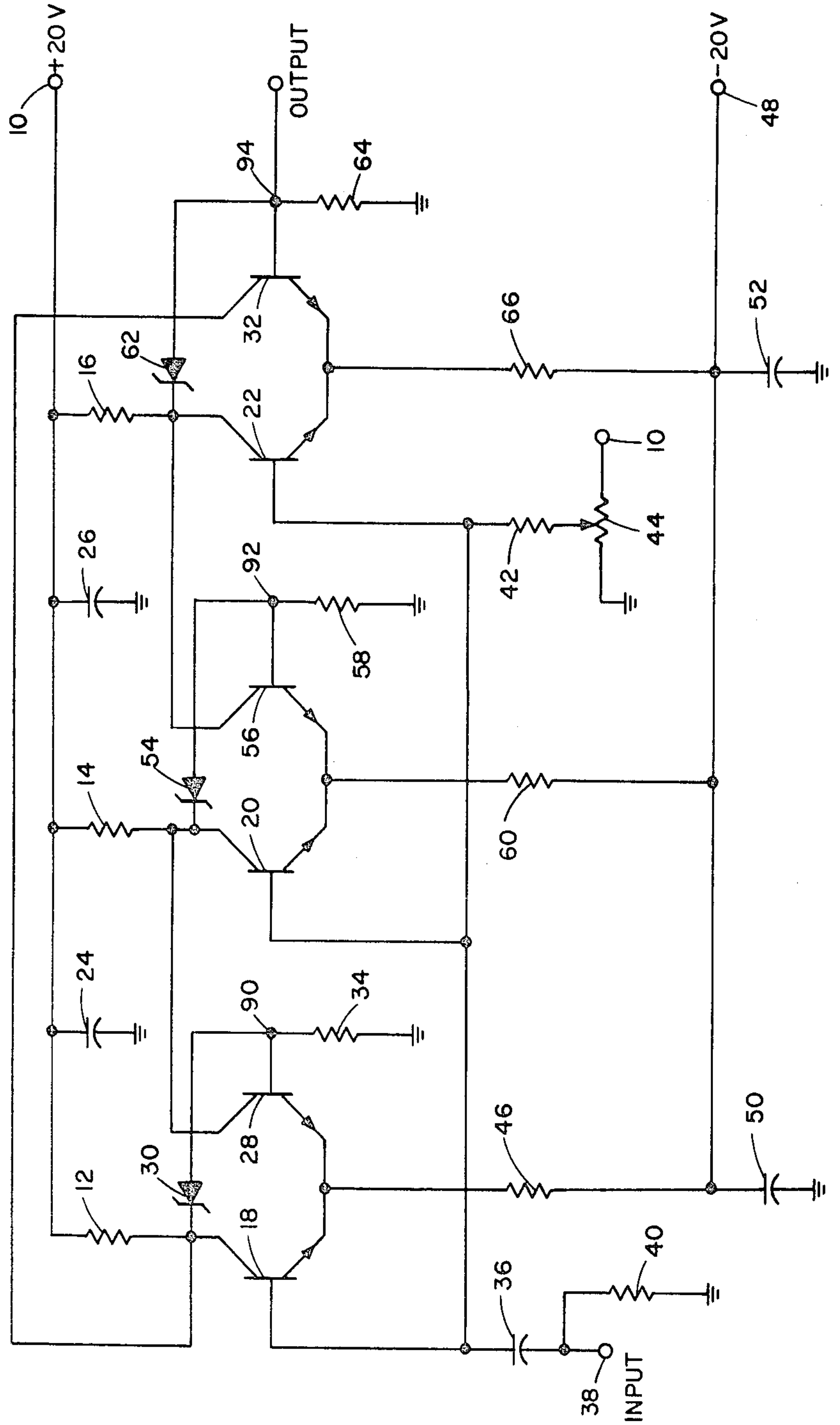
Figure 2:
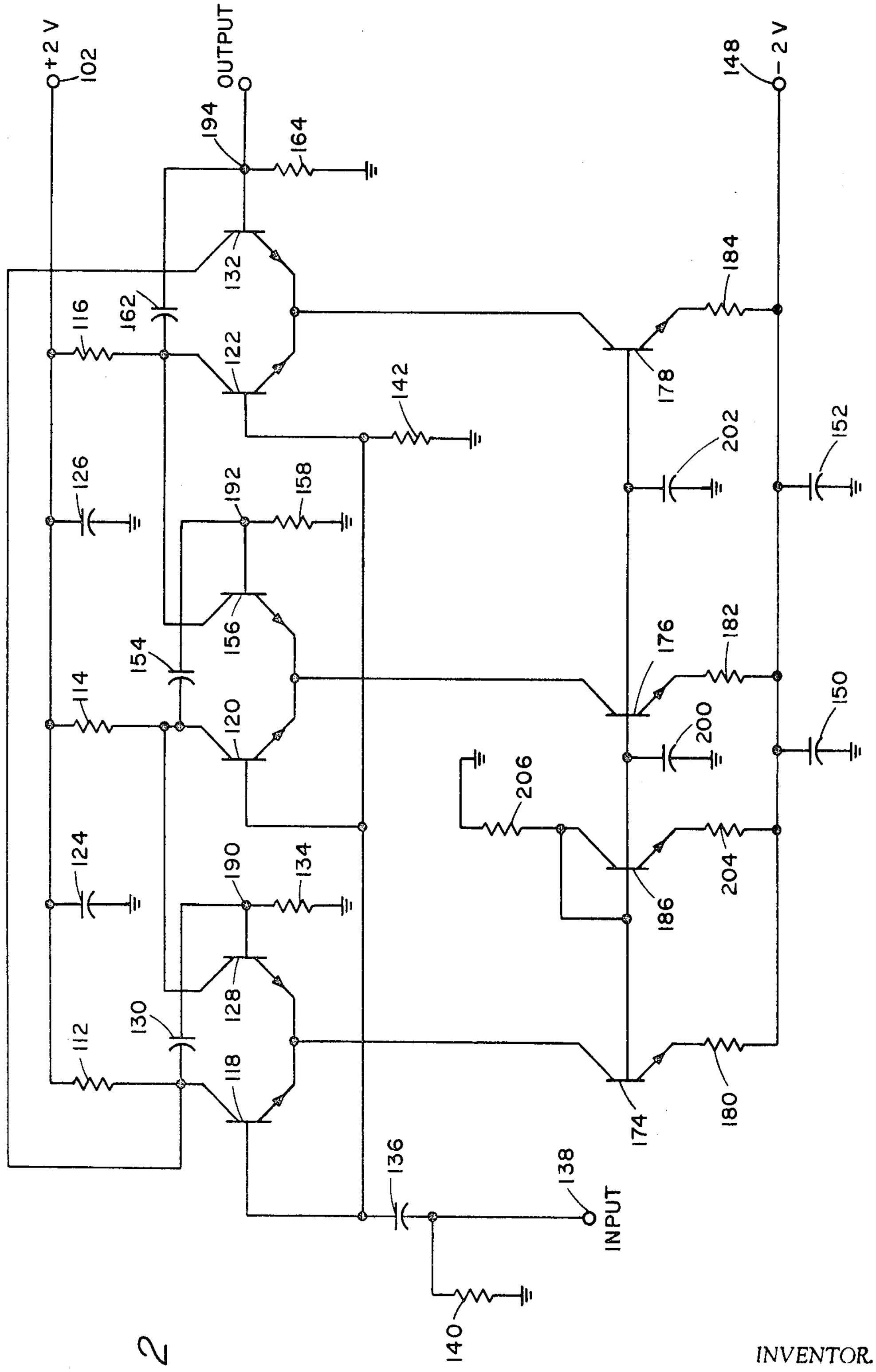
Figure 3:
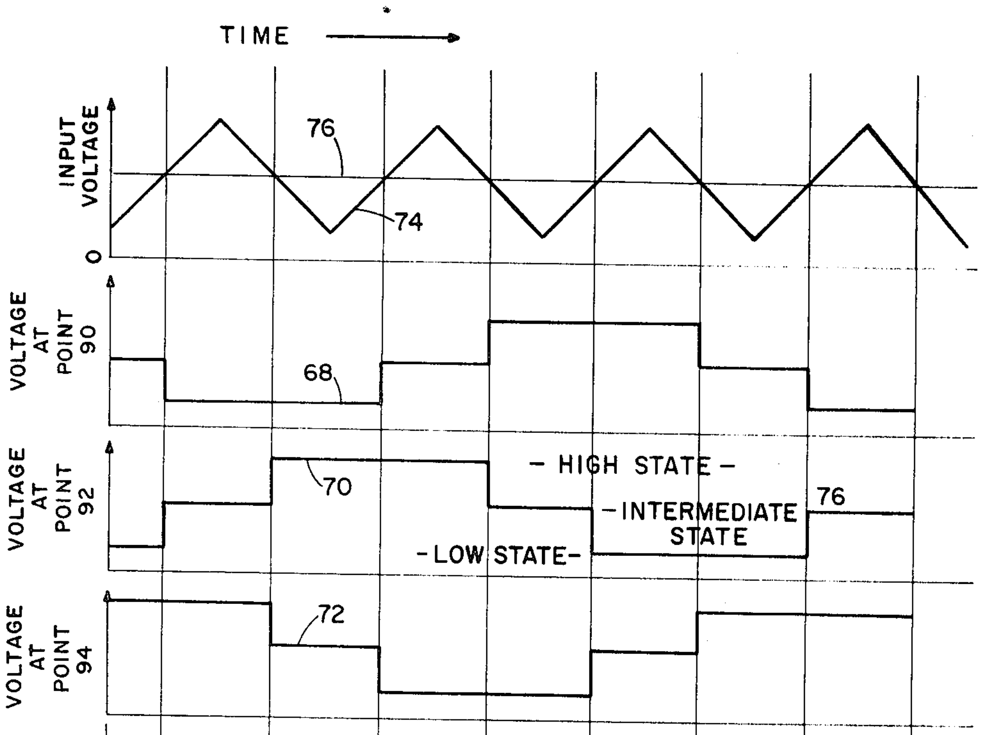

The invention may be better understood upon reading the following description in connection with the accompanying drawing in which FIG. 1 is a circuit diagram of a known frequency divider, FIG. 2 is a circuit diagram of a frequency divider which includes the present invention and FIG. 3 is a timing chart which is useful in explaining the operation of the disclosed frequency divider. First, the prior art circuit of FIG. 1 will be described and the operation thereof will be explained in connection with FIG. 3.

A positive terminal 10 of a voltage source, not shown, is connected by way of respective load resistors 12, 14 and 16 to the collectors of NPN transistors 18, 20 and 22. The terminal 10 is also connected to ground or to a point of reference potential by way of filter capacitors 24 and 26. The collector of the transistor 18 is connected to the cathode of a Zener diode 30 and to the collector of an NPN transistor 32. The anode of the Zener diode 30 is connected to the base of an NPN transistor 28 and to ground by way of a bias resistor 34. The base of the transistor 18 is connected by way of a coupling capacitor 36 to an input terminal 38 to which the wave whose frequency is to be divided is applied. The terminal 38 is connected to ground by way of a resistor 40. The base of the transistor 18 is also connected to the base of the transistors 20 and 22 and to one end of a resistor 42 whose other end is connected to the slider of a potentiometer 44. The resistance of the potentiometer 44 is connected between the positive terminal 10 and ground. The emitters of the transistors 18 and 28 are connected together and through a resistor 46 to the negative terminal 48 of a voltage source. The terminal 48 is also connected to ground by way of two filter capacitors 50 and 52.

The collector of the transistor 20 is connected to the collector of transistor 28 and to the cathode of a Zener diode 54 whose anode is connected to the base of an NPN transistor 56 and to ground through a resistor 58. The emitters of the transistors 20 and 56 are connected together and to the terminal 48 by way of a resistor 60. The collector of the transistor 56 is connected to the collector of the transistor 22. The collector of the transistor 22 is also connected to the cathode of a Zener diode 62. The anode of the Zener diode 62 is connected to the base of the transistor 32 and to ground by way of a resistor 64. The emitters of the transistors 22 and 32 are connected together and through a resistor 66 to the terminal 48. While the base of any one or all of the transistors 28, 56 and 32 may be output terminals for the frequency divider, the base of the transistor 32 is indicated as being the output terminal.

In explaining the operation of the described circuit, it is first noted that the transistors 18 and 28 are paired in that the emitters of the transistors 18 and 28 are coupled together. Therefore, if the transistor 18 is conductive or on, the transistor 28 must be nonconductive or off. And if the transistor 18 is off, the transistor 28 must be on. Similarly, the transistors 20 and 56 are paired and the transistors 22 and 32 are paired.

The bases of the transistors 28, 56 and 32, the points 90, 92 and 94 respectively, may have three distinct voltage values as shown by the rectangular curves 68, 70 and 72 of FIG. 3, as will be explained. While the input voltage to the terminal 38 may be a sine wave shape, it is shown for convenience of illustration as a triangular wave 74 in FIG. 3. As will be noted, the rectangular voltage waves 68, 70 and 72 are similar in shape but are phase displaced with respect to each other and the frequency of the voltage waves 68, 70 and 72 is one third of the frequency of the wave 74.

As the input voltage wave 74 increases and passes through an intermediate voltage value such as 76, it turns on one of those transistors 18, 20 and 22 to the base of which it is applied. The voltage on the base of the respective paired transistors 28, 56 and 32 determines which transistor will be turned on as will be explained. If a transistor 18, 20 or 22 is on, the voltage wave 74 while increasing does not change this condition of conductivity. As the input voltage wave 74 decreases and crosses the intermediate value 76, one of the transistors 18, 20 and 22 to which it is applied which is on is turned off. The voltage on the base of the respective paired transistors 28, 56 and 32 determines which transistor is turned off as also will be explained. If a transistor 18, 20 or 22 is off, the voltage wave 74 in going down does not change its conductivity. As noted in FIG. 3, the time duration of the waves 68, 70, 72 and 74 has been divided up into time intervals A, B, C, D, E, F, G and H, which except for the beginning time interval A are each equal to a half cycle of the control voltage wave 74.

Since the frequency divider of FIG. 1 is operating in a cyclic manner, the initial conditions noted for the time interval A can be assumed. That is, as the control voltage wave 74 is increasing, the voltage at the point 90 is at its intermediate value 76, the voltage at the point 92 is at its low value or minimum state and the voltage at the point 94 is at its high value or maximum state. Also, the transistors 18, 28, 20, 56, 22 and 32 are respectively off, on, on, off, off and on, for the assumed voltages at points 90, 92 and 94 to be correct. This is shown in the time interval column marked A of FIG. 3.

The current flow through each of the resistors 12, 14 and 16 is substantially constant. Likewise, the current flow through each of resistors 46, 60 and 66 is constant. Therefore, when the transistor 18 is off and the transistor 32 is on, the current flowing in the resistor 12 must flow partially through the Zener diode 30 and the resistor 34 to ground and partially through transistor 32. The actual current which flows through diode 30 and resistor 34 is equal to the difference between the current in resistor 12 and the current in resistor 66. This is the intermediate state. Thus, the voltage at the point 90 is at its intermediate value (same as 76) as shown by the position of the curve 68 in the time interval A. The transistor 28 is on and the transistor 20 is on, whereby the current flowing in the Zener diode 54 and in the resistor 58 is at its minimum value equal to the current in resistor 14 minus the sum of current in resistors 46 and 60 which flows through transistors 28 and 20 respectively. Thus, the point 92 is at its minimum state as shown by the curve 70 for the time interval A. The transistor 56 is off and the transistor 22 is off whereby the current flow through the Zener diode 62 and the resistor 64 is maximum equal to the current in resistor 16. Thus, the voltage at the point 94 is at its maximum state as shown by the curve 72 for the time interval A.

When the input voltage wave 74 crosses its intermediate value 76 in an increasing manner, the transistor 18 which was off at the end of interval A goes on at the beginning of interval B because the point 90 was at the intermediate value 76 during interval A. Current from the constant source resistance 46 flows through transistor 18 instead of through transistor 28. Due to the coupling provided by the Zener diode 30, as soon as the transistor 18 goes on and the transistor 28 is off, the voltage on the base of transistor 28, or point 90, goes to the low state which is equal to the current through resistor 12 minus the sum of the current in resistor 46 and resistor 66, assuming that transistor 32 remains on, which is the case, as will next be explained. The transistor 20 was on so it remains on and the transistor 56 remains off during interval B since the voltage at the base of transistor 20 is still greater than the voltage at the base of the transistor 56 in interval B. The transistor 22 was off and in spite of the fact that a rising voltage is applied to its base, the transistor 22 remains off because the voltage at the base of transistor 22 is still less than the voltage at the base of transistor 32 which is at the high state in interval B. Since the transistor 22 stays off, its paired transistor 32 stays on. Now the voltage at the point 90 must be in the low state since both transistors 18 and 32 are on. The voltage at the point 92 is in the intermediate state since the transistor 20 is on and transistor 28 is off and the voltage at the point 92 is in the intermediate state since the transistor 20 is on and transistor 28 is off and the voltage at the point 94 is in the high state since both transistors 22 and 56 are off, all as shown by the curves 68, 70 and 72 for the time interval B. The voltage wave 74 next decreases and again crosses the intermediate value 76. The transistor 18, which was previously on stays on, since the base of its paired transistor is in the low state at the end of the time interval B. The transistor 28, therefore, stays on. The transistor 20, previously on, now goes off since the base of its paired transistor 56 was at the intermediate state at the beginning of the time interval C. Transistor 22 remains off and transistor 32 remains on since the voltage at the base of transistor 32 is still higher than the voltage at the base of transistor 22. Therefore, during the time interval C, the point 90 is low, the point 92 is high and the point 94 is intermediate, all as shown by the curves 68, 70 and 72 for the time interval C. If this analysis is continued for three complete cycles of the input voltage wave 74, the waves 68, 70 and 72 will behave as indicated in FIG. 3 at the points 90 and 92 and 94 respectively during the successive time intervals D, E, F, G and H.

The frequency divider of FIG. 2, which embodies the present invention will now be described and its operation, where it differs from the operation of the divider of FIG. 1, will be explained. A positive terminal 102 of a source (not shown) is connected through filter capacitors 124 and 126 to ground or to a point of reference potential and through respective resistors 112, 114 and 116 to the collectors of respective NPN transistors 118, 120 and 122. The bases of the transistors 118 and 120 and 122 are connected together and to ground by way of a resistor 142 and to an input terminal 138 by way of a capacitor 136. A resistor 140 connects the input terminal 148 to ground. The emitters of the transistors 118, 120 and 122 are connected respectively to the emitters of NPN transistors 128, 156 and 132 and also respectively to the collectors of NPN transistors 174, 176 and 178. The collector of the transistor 118 is connected directly to the collector of the transistor 132 and by way of a coupling capacitor 130 to the base of the transistor 128 which is connected to ground through a resistor 134. The transistors 118 and 128 comprise a pair thereof. The collector of the transistor 120 is connected to the collector of the transistor 128 and to the base of an NPN transistor 156 by way of a coupling capacitor 154, the base of the transistor 156 being connected to ground by way of a resistor 158. The transistors 120 and 156 comprise a pair. The collector of the transistor 122 is connected to the collector of the transistor 156 and by way of a coupling capacitor 162 to the base of an NPN transistor 132 which is connected by way of a resistor 164 to ground. The transistors 122 and 132 comprise a pair. The output of the frequency divider of FIG. 2 may be the base of the transistor 28, that is the point 190 or the base of the transistor 156, that is the point 192 or the base of the transistor 132, that is the point 192 or the base of the transistor 132, that is the point 194 or all of these. For convenience, only the point 194 is labeled output on the drawing. The emitters of the transistors 174, 176 and 178 are connected to the negative terminal 148 of a source (not shown) through respective resistors 180, 182 and 184. The terminal 148 is connected to ground by way of filter capacitors 150 and 152. The bases of the transistors 174, 176 and 178 are connected together and to the base of an NPN transistor 186 and to ground by way of filtering capacitors 200 and 202. The emitter of the transistor 186 is connected to the terminal 148 by way of a resistor 204 and the collector of the transistor 186 is connected directly to its base and by way of a resistor 206 to ground.

The circuit of FIG. 2 resembles in many details and in general operation the known circuit of FIG. 1 which is described herein above. The differences between these circuits will now be noted and their significance will be discussed herein below. The terminals 10 and 48 of FIG. 1 are respectively at typically plus and minus 20 volts with respect to ground while in FIG. 2, the terminals 110 and 148 are typically at plus and minus 2 volts with respect to ground. In FIG. 1, the Zener diode 30 is used to couple the collector of transistor 18 to the base of the transistor 28, while other Zener diodes 54 and 62 are used to couple the paired transistors 20 and 56 and 22 and 32 in a similar manner. In FIG. 2, capacitors 130, 154 and 162 are used to similarly couple the paired transistors 118 and 128, 120 and 156, and 122 and 132 respectively in place of the Zener diode. In FIG. 1, relatively large resistors 46, 60 and 66, each in the order of 2,000 ohms, are connected to provide constant current sources for the emitters of each pair of transistors. Since the resistors 46, 60 and 66 are relatively large, the resistances 46, 60 and 66 provide fairly good constant current sources assuming the supply voltage is constant. In FIG. 2, the elements 186, 204 and 206 together with the elements 174 and 180 act as a constant current source for the paired transistors 118 and 128. The elements 186, 204 and 206 with the elements 176 and 182 act as a constant current source for the paired transistors 120 and 156, and the elements 186, 204 and 206 together with the elements 178 and 184 act as a constant current source for the paired transistors 122 and 132. The operation of these constant current sources is as follows: Since the terminal 148 is at a constant voltage with respect to ground, the voltage across the emitter resistor 204 as well as the voltage across resistor 206 is essentially constant. Due to the connection of the bases of the transistors 176, 174 and 178 to the base of the transistor 186 and due to the connection of the emitter resistors 180, 182 and 184 between the emitters of these respective transistors 174, 176 and 178 and the terminal 148, the voltage across the emitter resistors 180, 182 and 184 must also be constant and equal to the voltage across the resistor 204. Since the voltage across the resistors 180, 182 and 184 cannot change, current flow from the emitters of the transistors 174, 176 and 178 must be constant. In FIG,. 1, the high resistance 46, 60 and 66 is necessary to provide constant current sources for the paired transistors 18 and 28, 20 and 56, and 22 and 32. The source connected to the terminal 48 must be high enough to drive sufficient current through the several transistors 46, 60 and 66 to maintain satisfactory operation. It is noted that the source for supplying the current for the constant current sources comprising the elements 174, 176 and 178 is one-tenth of the voltage required to supply the constant current sources comprising the resistors 46, 60 and 66. The resistors 46, 60 and 66 are not particularly good constant current sources due to the effect of the varying voltages appearing at the bases of the transistors of FIG. 1, the effect being negligible on the current sources comprising the elements 174, 176 and 178.

Continuing the discussion of the difference between the circuits of FIGS. 1 and 2, it is noted that in FIG. 1, Zener diodes 30, 54 and 62 are used to couple respective paired transistors both in an AC and a DC manner. For this coupling to take place, the Zener diodes must be broken down, whereby the voltage applied to the Zener diodes from the terminal 10 must not only be high enough to break down the Zeners but also must be high enough to keep them broken down when the voltage drop across resistors 12, 14 and 16 is considered during circuit operation of the circuit of FIG. 1. Furthermore, the voltage on the collector of the transistors of FIG. 1 must at all times be higher than their respective bases if the transistors are to act as transistors. The voltage drops in the Zener diodes insures that the collectors of the transistors 28, 56 and 32 are higher positive than the bases thereof insuring proper operation. In contrast, the voltage applied to the collectors of the transistors 118, 128, 120, 156, 122 and 132 in FIG. 2 is about one-tenth of the voltage applied to the collectors of the transistors in FIG. 1.

Since there is N. DC current flowing through resistors 134, 158, and 164, the DC voltage at the base of transistors 128, 156, and 132 is essentially at ground potential. To insure proper operation, as mentioned earlier, the collector voltage of transistors 118, 128, 120, 156, 122, and 132, must always be sufficient even during signal swing, such that the collector-base junction of said transistors does not conduct in the forward direction. This is accomplished by insuring that the voltage at supply terminal 102 minus the maximum voltage drop across resistor 112 or resistor 114 or resistor 116 never becomes less than 0 volts. The maximum voltage drop across these resistors 112, 114 or 116 is equal to the sum of the current flowing through the two on transistors times the resistance value. In this manner, it can be seen that the voltage biasing of the collector to base junction of transistors 118, 128, 120, 156, 122, and 132 relies on the current source values, the resistance values of resistors 112, 114, and 116, and the positive supply voltage at terminal 102, instead of a Zener diode as in FIG. 1.

In both of FIGS. 1 and 2, good performance while dividing a high frequency input voltage wave is aided by using transistors which have good frequency response in the current range which these transistors will operate. Transistors are chosen for the divider which have a good frequency response even though these transistors are biased as low as 3 milliamps emitter current. Transistors having a frequency response $f_T$ equal to 1300 MHz. are satisfactory for this purpose. The range of current above 10 milliamps is used for the transistors of FIG. 1 while only 3 milliamps is used for the transistors of FIG. 2. For this reason, the current source value of current necessary for proper operation is reduced. In accordance with the invention, the capacitors 130, 154 and 162 of FIG. 2 are substituted for the Zener diodes of FIG. 1, whereby the voltage connected to the terminal 102 OF FIG. 2 need not be high to insure proper operation of a frequency divider since capacitors instead of zener diodes are used to couple signals from the collector to base of the paired transistors, Thus, the positive supply voltage in FIG. 2 is about one-tenth of the voltage necessary in FIG. 1. At the frequency of operation, the capacitors 130, 154 and 162 have low impedance giving the required substantial direct coupling between the collectors of the transistors 118, 120 and 122 and the base of the respective paired transistors 128, 156 and 132.

Furthermore, constant current devices which will supply the required 3 milliamps of emitter current at a very low voltage comprising the elements 186, 204, 206, 174 and 180 of FIG. 2 for the paired transistors 118 and 138 is substituted for the high valued resistor 46, for example, of FIG. 2. The constant current sources for FIG. 2 require only minus 2 volts instead of the minus 20 volts of FIG. 2. Since the voltage applied to and the currents flowing from the positive to the negative supply through the divider of FIG. 2 is so much less than the voltage applied to and the currents flowing through the divider of FIG. 1, the power requirements of the divider of FIG. 2 is about one-seventieth of the power requirement of the divider of FIG. 1 and yet the divider of FIG. 2 operates quite satisfactorily.

If the divider of FIG. 2 (except for the several filter capacitors) is put on a chip, a diode may be substituted for each of the several coupling capacitors 136, 130, 154 and 162. Then, the diode can function either as a low voltage Zener as in FIG. 1 or it can be placed such than no current flows through the diode in either the forward or reverse direction and the capacity possessed by the diodes is used as a coupling means as in FIG. 2.

CLAIMS

What is claimed is:

1. A frequency divider comprising
   at least three pairs of transistors each having a base, an emitter and a collector,
   a connection between the emitters of the two transistors comprising a pair thereof,
   a capacitor connected between a collector of a first transistor of a pair to the base of the second transistor of each pair,
   a direct coupling between the collector of the second transistor of a pair to the collector of the first transistor of another pair of transistors in a ringlike manner,
   a constant current source including a resistor in series with a collector to emitter path of a further transistor, connected between a supply terminal and the connected emitters of said pairs of transistors,
   a respective impedance connected between a supply terminal and the collector of each of said first transistors of said pairs and,
   means to apply a voltage wave whose frequency is to be divided to the bases of the first transistor of each pair thereof.

2. The invention of claim 1 in which resistors are provided between a supply connection for said transistors and the collector of one transistor of a pair thereof, the size of said resistors being so chosen that when maximum current is flowing through a resistor, the voltage drop thereacross is less than the voltage of a source connected to said supply connection, thereby insuring proper operative potentials for operation of said transistor.

3. The invention of claim 2 in which each of said resistors is also connected between said supply terminal and the collector of a transistor of a pair of transistors other than the pair of said one transistor.

4. The invention as expressed in claim 1 in which said constant current means also includes an additional transistor, a connection from a point of reference potential through a second resistor and the collector to emitter path of said additional transistor and through a third resistor to said supply terminal, the base of said further transistor and said additional transistor being connected together.

5. The invention as expressed in claim 1 in which said impedance connected to a supply terminal comprises a resistor.

6. The invention as expressed in claim 5 in which said impedance connected to a supply terminal comprises a resistor.

* * * * *